United States Patent

Hartung

[15] 3,662,150

[45] May 9, 1972

[54] CONTROLLED TEMPERATURE CIRCUIT PACKAGE

[72] Inventor: Dale H. Hartung, Costa Mesa, Calif.

[73] Assignee: Hughes Aircraft Company, Culver City, Calif.

[22] Filed: Jan. 18, 1971

[21] Appl. No.: 107,378

[52] U.S. Cl. ....................219/209, 219/543

[51] Int. Cl. ....................H05b 1/00

[58] Field of Search....................219/209, 210, 213, 345, 510, 219/501, 538, 543, 553; 310/8, 8.9, 9; 317/235 Q

[56] References Cited

UNITED STATES PATENTS

| | | | |
|---|---|---|---|
| 3,617,692 | 11/1971 | Landis | 219/505 |
| 3,584,189 | 6/1971 | Marcoux | 219/504 |
| 3,414,704 | 12/1968 | Flanagan | 219/510 X |
| 3,395,265 | 7/1968 | Weir | 219/209 |
| 2,961,522 | 11/1960 | Hammer | 219/543 X |
| 3,266,661 | 8/1966 | Dates | 219/543 X |
| 3,393,870 | 7/1968 | Jeffrey | 219/501 X |
| 3,274,359 | 9/1966 | Riebs | 219/543 X |
| 1,870,698 | 8/1932 | Trogner | 310/9 |
| 2,731,564 | 1/1956 | Edlstein | 219/210 X |

*Primary Examiner*—C. L. Albritton
*Attorney*—W. H. MacAllister, Jr. and Joseph E. Szabo

[57] ABSTRACT

A circuit board, carrying a plurality of electrical components on one side is enclosed in a housing. The board is thermally conductive and carries a resistive film on its opposite side through which current may be driven to keep the filter components at a desired temperature.

9 Claims, 5 Drawing Figures

(PRIOR ART)

INVENTOR.
DALE H. HARTUNG,
BY

[signature]

ATTORNEY.

CONTROLLED TEMPERATURE CIRCUIT PACKAGE

This invention relates to the packaging of circuits and more particularly, to internally heated circuit packages for temperature sensitive circuit components.

When a temperature sensitive circuit must operate over a wide temperature range, a widely used solution is to maintain the circuit at a predetermined elevated temperature which is at the top of the circuit's prescribed operating range. In this way, the effect of external temperature variations is substantially eliminated. This general technique is often employed with electronic filter circuits whose resonant frequency is determined by temperature sensitive components such as crystals, inductors and capacitors. With such filter circuits, it is desirable not only to maintain the components at a predetermined temperature, but it is also desirable to maintain all components of a particular filter at a common temperature. This is so because the resonant frequency of a filter is a function of the product of the values of its inductor and capacitor components. Consequently if these components are at a common temperature, it is possible to design them with opposite temperature coefficients so that, as the value of one increases, the value of the other one decreases correspondingly, thereby maintaining the product of their values constant, even though their temperature might change. Thus, if the components of a given filter circuit can be maintained at substantially the same temperature, the resonant frequency of the circuit can be held relatively constant even though its temperature should change, making possible the operation of the circuit without the continuous application of heater current thereto. This is particularly so where there are other circuit components associated with the filter circuit which are operated concurrently therewith and which generate enough heat during operation to maintain the filter circuit temperature within its operating range. In such a case, all that is necessary is that the heater current be applied prior to the time when the filter circuit is to operate within its specified limits. The heater current need be applied only until the temperature of the filter circuit components is brought up to their minimum operating level, and is maintained there by the heat generated by the other associated circuit components. Alternatively, of course, where the heat generated either in the filter circuit or in related circuits is not sufficient to keep the temperature of the filter circuit at its prescribed operating temperature, it may be necessary to maintain the heater current throughout the operation of the filter circuit.

To maintain a group of circuit components, such as those of a filter, at a common temperature above ambient, they are usually mounted on a board and enclosed within a metal can. An electric heater is mounted on the outside of the can and, to ensure that the heat generated by the heater flows into the can, they are enveloped in thermal insulation and placed in a second, or outer, can. This arrangement has at least two disadvantages. First, it is bulky because of the thermal insulation which is necessary to direct the generated heat inwardly at the electrical components. Secondly, since the components inside the can are spaced from the heater, and are insulated therefrom by air, the time that it takes for their temperature to rise to their predetermined value, called the "thermal lag," is quite long, of the order of several minutes.

It is a principal object of the present invention to produce a circuit package whose size is significantly smaller than that of presently available circuit packages.

A related object of the invention is to reduce the thermal lag inherent in presently available internally heated electronic packages.

A specific object of the present invention is to produce a filter package which is flat and which can be put into operation rapidly.

These and other objects and advantages of the invention are realized by a circuit package wherein several electrical components are held at substantially the same temperature by mounting them on at least one side of a common thermally conductive board and driving a current through a heating element fixed to the same board. Preferably, the components are on one side and the heating element is on the other side, the latter being in the form of a resistive film plated upon the board so as to form, with the board, a panel heater. Heat flows rapidly, efficiently and evenly from the heater to the components due to the thermally conductive board between them. This technique is to be distinguished from that disclosed and claimed in Garland, et al. U.S. Pat. No. 3,431,392, assigned to the same assignee, wherein a single crystal wafer is heated directly by a film resistor deposited thereon. The circuit package of the present invention is particularly applicable to electronic filters having several crystals housed in metal cans. The flow of heat from the heater to these crystals is further enhanced in accordance with the invention by laying the crystal cans flat and soldering them to the metal strips on the board. In further keeping with the invention, a grounded conductive layer is sandwiched between the components and the heater to prevent signals from being coupled from one component to another through the heater.

The invention will be described in greater detail by reference to the drawings in which.

Figure 1:
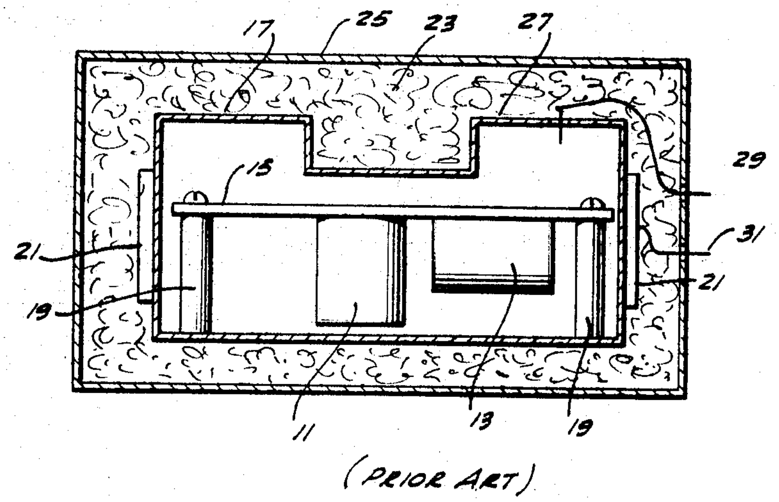
FIG. 1 is a cross section through an internally heated electronic package utilizing existing construction techniques.

A typical internally heated package constructed in accordance with current techniques is illustrated in FIG. 1. Basically, it includes a plurality of electronic components, exemplified by the components 11 and 13, attached to a mounting board 15 enclosed within a metal container 17. The mounting board 15 is carried inside the container 17 by means of spacers 19 whose length is designed to ensure that neither of the electronic components 11 and 13 touches the container 17. An electric heater 21 of conventional construction is attached or bonded to the outside of the container 17.

In order to prevent the majority of the heat generated by the heater 21 from escaping away from the container 17 and its contents, the entire assembly is surrounded with a relatively thick layer of thermal insulation 23 which in turn is enclosed by a second metal container 25. Terminals 29 and 31 are provided in the inner and outer containers 25 and 17 to permit the necessary wires to be connected to the heater 21 and the components 11 and 13.

In typical operation, current is applied to the heater 21 before the electric circuit inside the package is turned on. Then, when a designated point inside the inner container 17 reaches a desired temperature, the circuit is put into operation. It is apparent that there will be an inherent delay from a cold start to the time when the circuit can be used. Called thermal lag, this delay can be seen to be due primarily to the separation between the heat source, namely the heater 21, and the components 11 and 13 which are to be heated. Not only are the components separated from the heat source, but they are separated by a very poor conductor of heat, namely air. Thus the thermal lag is considerable. These same factors also necessitate that a considerable amount of thermal insulation 23 be applied around the heater 21 in order to ensure that at least a substantial portion of the heat generated in the heater 21 will reach those components.

Figure 2:
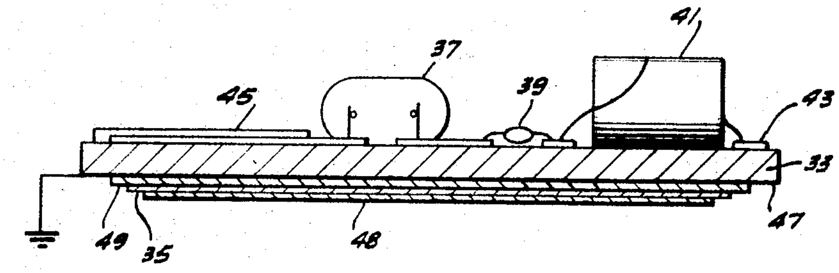
(PRIOR ART) FIG. 2.
FIG. 2 is a cross section through an integrally heated electronic package having components mounted on the one side of a thermally conductive board and a resistive film plated on the opposite side of the board in accordance with the present invention.
Figure 3:
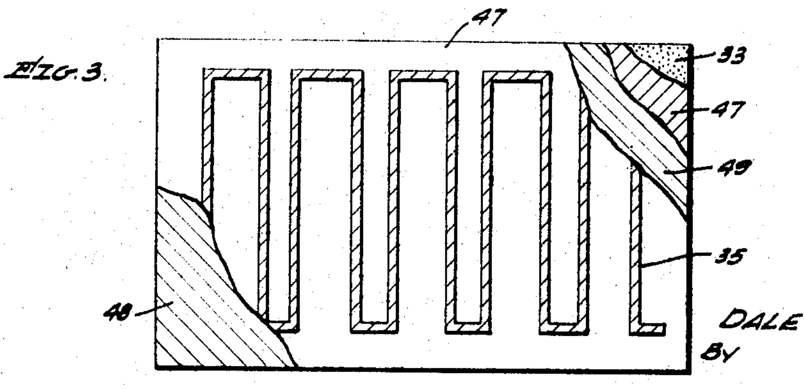
FIG. 3 is a bottom view of the package of FIG. 2, to illustrate a typical pattern for its resistive film.

An improved package of reduced size and small thermal lag is illustrated in FIGS. 2 and 3. It is comprised principally of a component mounting board 33, an electric heating element 35 affixed on one side of the board, and a plurality of discrete electrical components exemplified by a metal encased crystal 37, a capacitor 39, and an inductor 41 mounted on and distributed over the opposite side of the board. Conductive strips 43 are deposited on the component side of the board by conventional techniques to provide a means for interconnecting those components and are covered by protective insulation 45, also by conventional techniques. Preferably the electric heating element 35 is in the form of a film resistor as shown in FIGS. 2 and 3, plated upon the board 33 which, in accordance with an important feature of the invention, is composed of an electrically insulating but thermally conductive material, preferably alumina (aluminum oxide), in order to facilitate the transfer of heat from the heating element 35 to the electric components on the opposite side of the board. Where the heating element 35 is in the form of a film, as shown in FIGS. 2 and 3, a protective layer of insulation 48 is preferably deposited over it. Optionally, a conductive layer 47 may be sandwiched between the board 33 and the film resistor 35, the two being separated by an insulating layer 49. By connecting the conductive layer 47 to a reference potential, particularly ground, inadvertent or undesirable coupling of signals from one component to the other through the resistive film 35 can be eliminated.

Current is typically supplied to the film resistor 35 through plated electric conductors connected to its opposite ends. The film resistor 35 may be deposited in various shaped patterns, of which the pattern shown in FIG. 3 is typical. Its composition and dimensions are not critical, being selected on the basis of the available power supply and voltage, the size of the board and the amount of heating power to be dissipated therein.

The advantages of the improved electronic package of FIGS. 2 and 3 over that shown in FIG. 1 will be immediately apparent. Heat from the resistive film heater 35 tends to flow toward the electronic components on the opposite side of the board due to their proximity and the thermal conductivity of the component mounting board 33 between them. Moreover, because of the thermal conductivity of the board 33, the temperature of the various components tends to remain at the same level.

Figure 4:
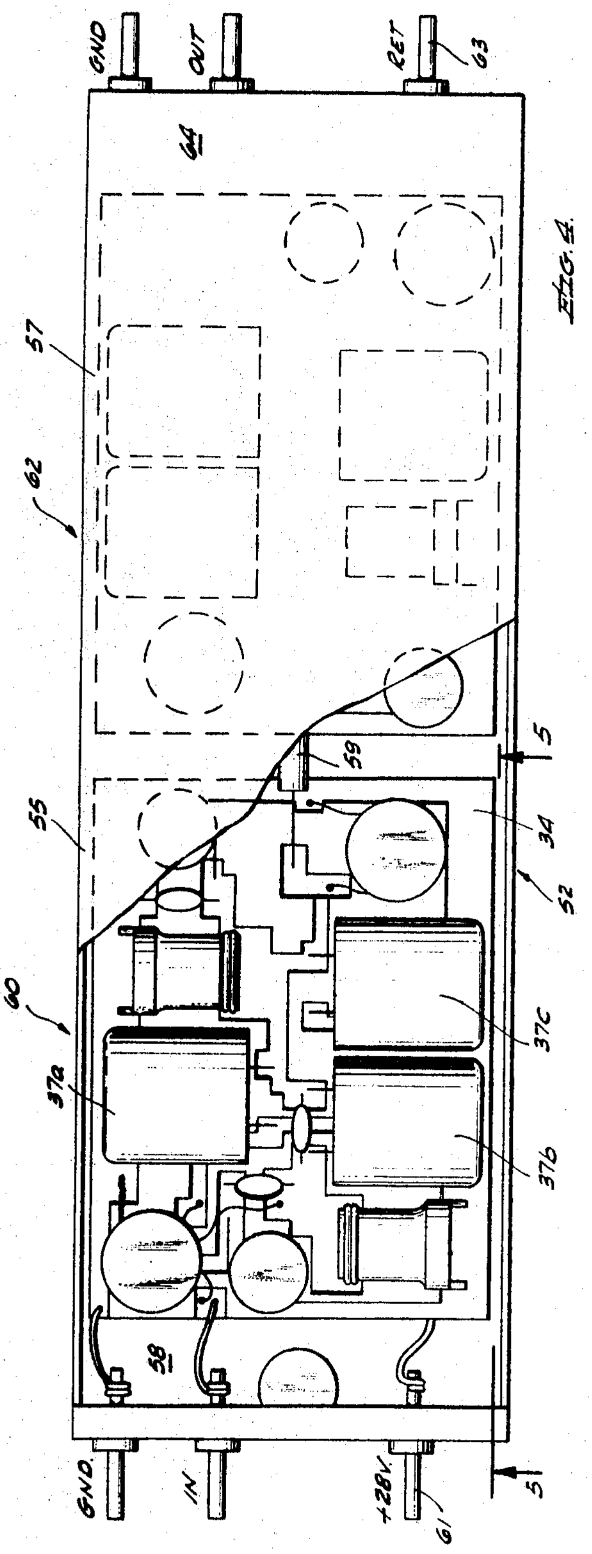
FIG. 4 is a plan view, partially broken away, of an internally heated electronic package comprised of a pair of units of the type shown in FIG. 2 and enclosed in a common case.
Figure 5:
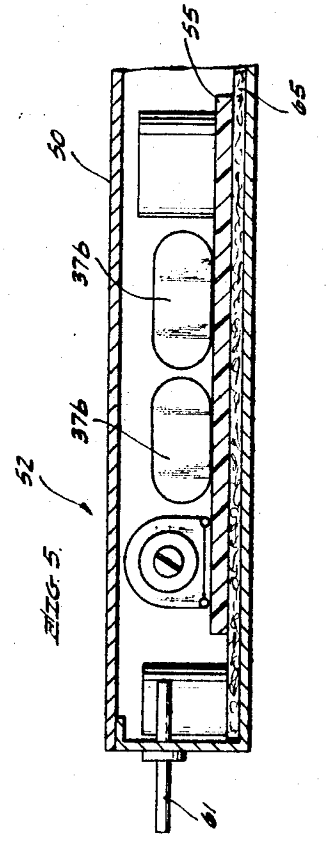
FIG. 5 is a cross section on lines 5—5 of FIG. 4 illustrating the position of the thermally conductive mounting board inside the case.

In order to facilitate the flow of heat into the metal encased crystal 37, it is an additional feature of the present invention that the case be mounted flat on one of its sides and that it be soldered to one or more ground strips 34 on the surface of the mounting board 33. This feature is better shown in FIGS. 4 and 5 which also shows the manner in which a pair of thermally conductive mounting boards carrying electronic components may be enclosed in a single protective housing to form an integral unit. The unit illustrated in FIGS. 4 and 5 is a filter 52 having two stages 60 and 62, each constructed in the manner illustrated in FIGS. 2 and 3, on respective thermally conductive boards 55 and 57. Signals are applied to the input end 58 of the first filter stage 60, are coupled therefrom through a resistor 59 to the second filter stage 62 and are taken from the output end 64 of that stage. Characteristically of both filter stages, the crystals 37*a*, 37*b*, and 37*c* of the first stage 60 are each positioned over a relatively wide electrically conductive strip 34 on the board 55 and are soldered thereto for maximum thermal contact therewith. For wiring simplicity, the resistive film layers on the respective boards 55 and 57 may be connected in series to form a single heater circuit connected between terminals 61 and 63 at opposite ends of the filter 52 which are in turn connected to a suitable source of electric current, such as a 28-volt power supply. As seen in FIG. 5, because of the good thermal conductivity of the mounting board 55, it is sufficient for purposes of thermal insulation merely to provide a thin foam cushion 65 between the board 55 and the wall of the case 50 against which it rests.

There has thus been described a circuit packaging concept which permits a plurality of electronic components in a single package to be brought rapidly to a desired uniform temperature level and this with practically no increase in the size of the package over that which would be required even if the heating feature were omitted.

What is claimed is:

1. An integrally heated electronic package comprising:
a. a thermally conductive component mounting board;
b. an electric heating element permanently and intimately affixed on one side of said board in contiguous thermal contact therewith; and
c. a plurality of discrete electrical components mounted on and distributed over the opposite side of said board in contiguous thermal contact therewith.

2. An electronic package in accordance with claim 1 characterized further in that said heating element is a film resistor.

3. An internally heated electronic package comprising in combination:
a. a case;
b. at least one thermally conductive component mounting board supported within said case;
c. a plurality of electrical components mounted on one side of said board in contiguous thermal contact therewith; and
d. a film resistor having means to receive a heating current and deposited on the opposite side of said board.

4. An integrally heated electronic package in accordance with claim 1 and characterized further by an electrically conductive layer between said board and said heating element, said layer having means to connect it to a ground potential to reduce electric coupling between components through said heating element.

5. An electronic package in accordance with claim 1 and characterized further in that some of said electric components are crystals housed in flat metal cans, said cans being mounted so that at least one wall is contiguous with said board for better heat transfer and a lower profile.

6. An electronic package in accordance with claim 5 and characterized further in that said metal cans are soldered to electrical conductors on said board for better heat transfer.

7. A panel for supporting and heating a plurality of electrical components comprising:
a. a thermally conductive, electrically nonconductive substrate;
b. a resistive film disposed on one side of and in contiguous thermal contact with said substrate; and
c. an electrically conductive layer sandwiched between said film and said substrate, said layer being provided with means to connect it to a ground potential to attenuate signal coupling between components mounted on the opposite side of said panel through said film.

8. A panel in accordance with claim 7 characterized further in that an electrically conductive film is sandwiched between said resistive film and said substrate, said conductive film having means to connect it to a ground potential to prevent signal coupling between electrical components mounted on said board through said heating element.

9. An internally heated filter package comprising:
a. a container;
b. a thermally conducting component mounting board within said container;
c. a plurality of components electrically interconnected to form a filter, said components including crystals in metal cans, mounted on one side of said board in thermal contact therewith;
d. a film resistor having means to receive a heating current and extending along the opposite side of said board in thermal contact therewith; and
e. an electrically conductive layer sandwiched between said board and said film resistor, and having means to connect it to a ground potential so as to attenuate signal coupling between said components through said film resistor.

* * * * *